(12) United States Patent
Kinohara

(10) Patent No.: US 12,406,698 B1
(45) Date of Patent: Sep. 2, 2025

(54) MAGNETIC DISK DEVICE AND METHOD OF CONTROLLING THE SAME

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Yuma Kinohara, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/830,907

(22) Filed: Sep. 11, 2024

(30) Foreign Application Priority Data

Apr. 8, 2024 (JP) ................................. 2024-062233

(51) Int. Cl.
  *G11B 5/54* (2006.01)
  *G11B 19/04* (2006.01)
  *G11B 27/30* (2006.01)

(52) U.S. Cl.
  CPC ........ *G11B 19/045* (2013.01); *G11B 27/3045* (2013.01); *G11B 2220/2516* (2013.01)

(58) Field of Classification Search
  CPC ....... G11B 15/52; G11B 5/54; G11B 5/59633; G11B 5/59627; G11B 5/59638; G11B 15/02; G11B 15/09
  USPC .......................................................... 360/75
  See application file for complete search history.

(56) References Cited

U.S. PATENT DOCUMENTS

| | | |
|---|---|---|
| 5,583,876 A | 12/1996 | Kakuta |
| 5,720,025 A | 2/1998 | Wilkes et al. |
| 5,872,800 A | 2/1999 | Glover et al. |
| 8,159,924 B2 * | 4/2012 | Uchida ............... G11B 7/0945 369/112.23 |
| 11,294,767 B2 | 4/2022 | Palmer |

* cited by examiner

*Primary Examiner* — Nabil Z Hindi
(74) *Attorney, Agent, or Firm* — Knobbe, Martens, Olson & Bear, LLP

(57) ABSTRACT

According to one embodiment, a magnetic disk device includes a first write control section of writing first data and second data to each of the sectors of a predetermined track among the tracks, a second write control section of writing the first data to each of the sectors of a predetermined track among the tracks, and a selection control section of, when receiving a write command, estimating the time required from start of a process of the first write control section to end of the process, and selectively executing the process of the first write control section or a process of the second write control section by comparing the estimated time with a time limit specified in advance.

10 Claims, 6 Drawing Sheets

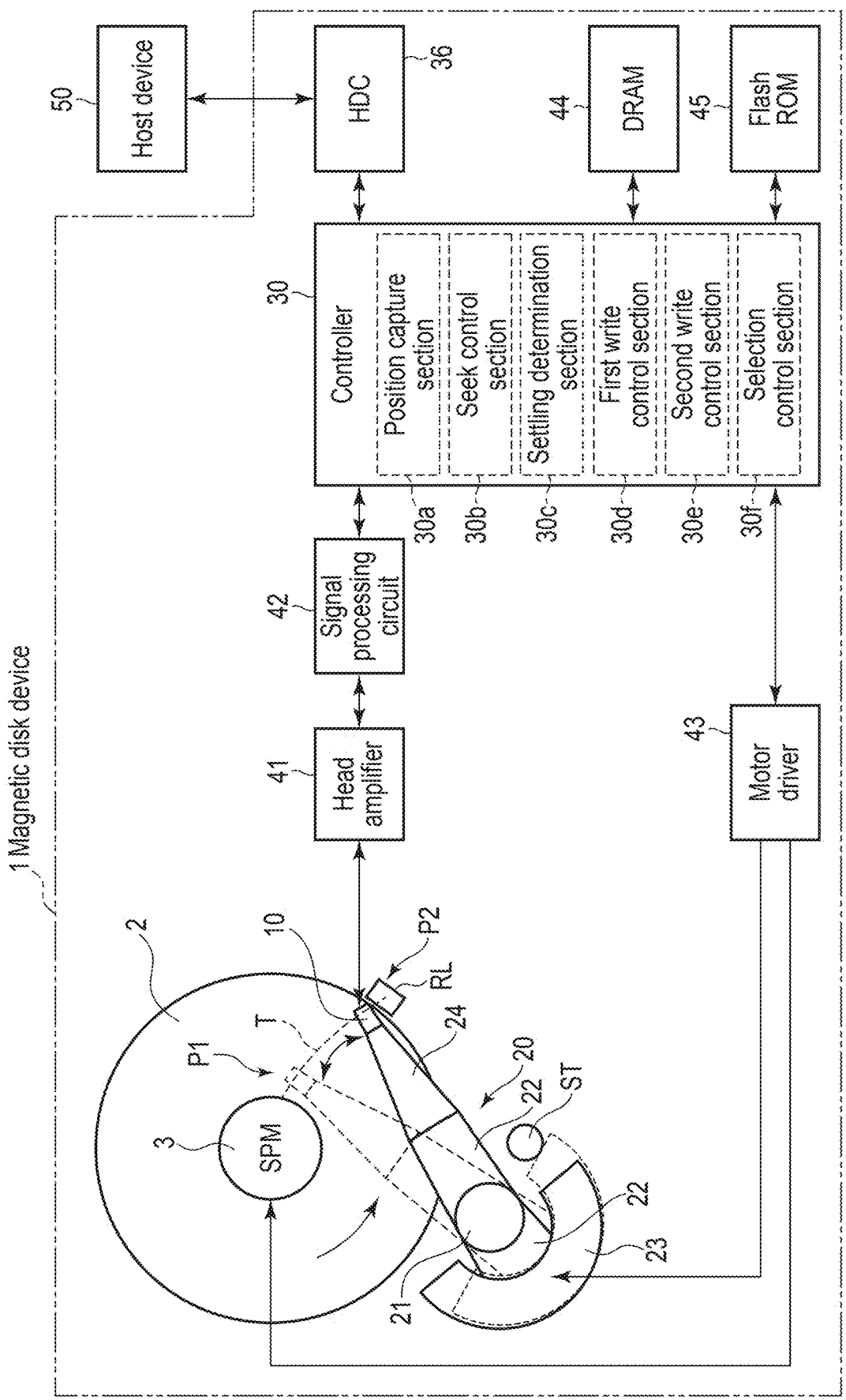
F I G. 1

MAGNETIC DISK DEVICE AND METHOD OF CONTROLLING THE SAME

CROSS-REFERENCE TO RELATED APPLICATIONS

This application is based upon and claims the benefit of priority from Japanese Patent Application No. 2024-062233, filed Apr. 8, 2024, the entire contents of which are incorporated herein by reference.

FIELD

Embodiments described herein relate generally to a magnetic disk device comprising a magnetic disk and a magnetic head, and a method of controlling the magnetic disk device.

BACKGROUND

A magnetic disk device comprising a magnetic disk and a magnetic head executes writing and reading data to and from the magnetic disk in response to write and read commands transmitted from an external host device (host computer).

When a so-called latency limit, which limits the delay in writing data, is specified by the host device, the magnetic disk device executes the data write process within the time limit of the latency limit.

As data to be written to the magnetic disk, there are user data, which is the first data, and auxiliary second data such as error correction codes (ECC) for the user data and log data related to writing the user data. When the end timing of the time limit of the latency limit arrives during writing the second data, the magnetic disk device needs to stop writing the second data. In this case, the magnetic disk device suddenly needs to execute a procedure of forcibly writing the second data that could not be written, and the performance of subsequent data write is degraded due to the sudden execution of this procedure. This performance degradation leads to delay in writing the data.

BRIEF DESCRIPTION OF THE DRAWINGS

FIG. 1 is a diagram showing an overall configuration of each embodiment.

DETAILED DESCRIPTION

Figure 2:
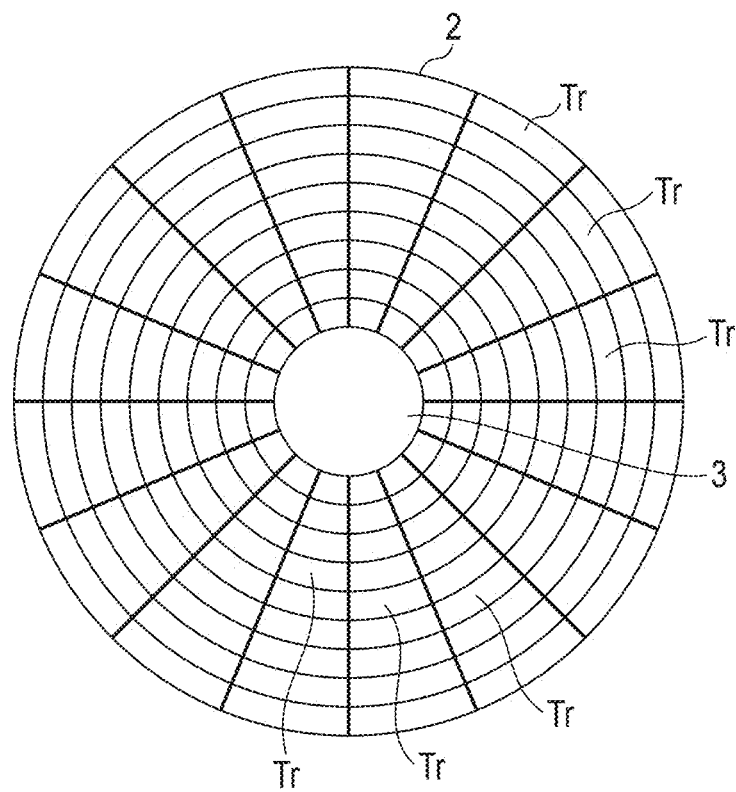
FIG. 2 is a diagram showing a configuration of main portions of the magnetic disk in each embodiment.

In general, according to one embodiment, a magnetic disk device includes a circular magnetic disk including a plurality of tracks for data recording composed of a plurality of sectors arranged in a circumferential direction, the tracks being arranged in a radial direction, a magnetic head provided to seek in the radial direction of the magnetic disk and which writs and reading data to and from the magnetic disk, and a controller which controls rotation of the magnetic disk and seek of the magnetic head. The controller includes a first write control section of writing first data and second data to each of the sectors of a predetermined track among the tracks, a second write control section of writing the first data to each of the sectors of a predetermined track among the tracks, and a selection control section of, when receiving a write command, estimating the time required from start of a process of the first write control section to end of the process, and selectively executing the process of the first write control section or a process of the second write control section by comparing the estimated time with a time limit specified in advance.

(1) First Embodiment

A first embodiment will be described hereinafter with reference to the accompanying drawings.

As shown in FIG. 1, a magnetic disk device 1 includes a magnetic disk 2 serving as a recording medium, a spindle motor 3 that drives rotation of the magnetic disk 2, and a magnetic head 10 that writes and reads data to and from the magnetic disk 2. An actuator 20 supporting the magnetic head 10 is arranged near the magnetic disk 2.

The actuator 20 supports the magnetic head 10 in a radial direction of the magnetic disk 2 so as to seek. In other words, the actuator 20 is also referred to as an actuator block or head stack assembly (HSA), and includes a rotary shaft 21, an arm 22 with a middle part held by the rotary shaft 21, a voice coil motor (VCM) 23 provided at a proximal portion of the arm 22, a suspension member 24 provided at a distal portion of the arm 22 to hold the magnetic head 10, and the like, and rotates the magnetic head 10 from a first position P1 represented by a broken line to a second position P2 represented by a solid line by supplying a drive current to the voice coil motor 23. In accordance with this rotation, the magnetic head 10 seeks (moves) in the radial direction of the magnetic disk 2 in a locus T shown in the drawing.

A stopper ST and a ramp mechanism RL are arranged near the actuator 20. The stopper ST limits the position movement of the magnetic head 16 on the inner circumferential side of the magnetic disk 12. The ramp mechanism RL limits the position of movement of the magnetic head 16 on the outer circumferential side of the magnetic disk 12.

The magnetic disk device 1 includes a controller 30 that serves as the center of control, a head amplifier 41 that drives the magnetic head 10, a signal processing circuit 42 provided in the connection between the head amplifier 41 and the controller 30, a motor driver 43 provided in the connection between the voice coil motor 23 and the controller 30, a DRAM 44 that is a memory storing programs, and the like necessary for the control of the controller 30, a flash ROM 45 that is a memory storing various data necessary for the control of the controller 30, a hard disk controller (HDC) 46 provided in the connection among the controller 30, the hard disk controller (HDC), and an external host device (host computer) 50, and the like.

The head amplifier 41 amplifies data signals for write from the signal processing circuit 42 to the magnetic head 10 and also amplifies data signals to be read by the magnetic head 10. The signal processing circuit 42 appropriately processes data signals for write from the controller 30 to the magnetic head 10 and supplies the signals to the head amplifier 41, and also appropriately processes read data signals amplified by the head amplifier 41 and supplies the signals to the controller 30. The motor driver 43 controls the drive current for the spindle motor 3 and the drive current for the voice coil motor 23 of the actuator 20 in response to instructions from the controller 30.

Figure 3:
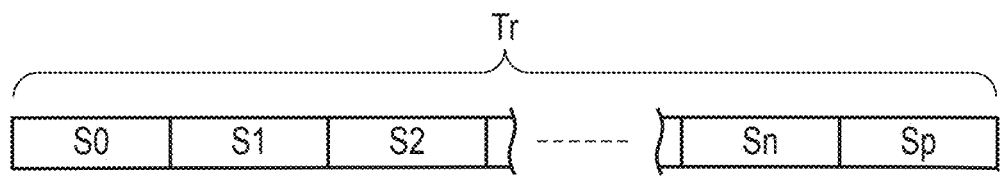
FIG. 3 is a diagram showing one track and plural sectors of a magnetic disk in the first embodiment.

As shown in FIG. 2, the magnetic disk 2 has a circular shape fitted coaxially with the rotational axis of the spindle motor 3 and includes a plurality of tracks Tr for recording data, which are formed to be arranged in a radial direction. As shown in FIG. 3, each track Tr includes a plurality of first sectors S1, S2, . . . , Sn aligned in the circumferential direction of the magnetic disk 2 and at least one second sector Sp following the end of the arrangement of these first sectors S1, S2, . . . , Sn.

The first sectors S1, S2, . . . Sn are sectors for recording, for example, the user data used by a user of the magnetic disk device 1, which is main first data. The second sector Sp is a sector for recording, for example, track Error-Correcting Code (ECC), which is auxiliary second data related to the user data. The track ECC is an error-correcting code that executes error detection and correction of the user data for each track Tr.

The controller 30 includes as main functions a position capture section 30*a*, a seek control section 30*b*, a settling determination section 30*c*, a first write control section 30*d*, a second write control section 30*e*, and a selection control section 30*f*.

[Position Capture Section 30*a*]

The position capture section 30*a* captures a position of the magnetic head 10 on the magnetic disk 2, based on the position data of a servo pattern SB included in the read data of the magnetic head 10.

[Seek Control Section 30*b*]

The seek control section 30*b* seeks the magnetic head 10 from a stop position on the magnetic disk 2 to a target position by controlling the drive (drive current) of the voice coil motor 23 of the actuator 20. More specifically, the seek control section 30*b* seeks the magnetic head 10 from the stop position on the magnetic disk 2 to the target position, including acceleration and deceleration in order, by controlling the drive (drive current) of the voice coil motor 23 of the actuator 20, based on the capture position of the position capture section 30*a*.

[Settling Determination Section 30*c*]

The settling determination section 30*c* executes so-called settling determination, which determines that the magnetic head 10 has reached the target position when a certain period has elapsed in a state in which the capture position Pos of the position capture section 30*a* is within a predetermined range including the target position.

[First Write Control Section 30*d*]

The first write control section 30*d* seeks the magnetic head 10 to a predetermined track Tr among the tracks Tr of the magnetic disk 2 under the control of the seek control section 30*b* and, writes user data (first data) to the predetermined number of first sectors from the beginning, among the first sectors S1, S2, . . . Sn on the predetermined track Tr in accordance with the rotation of the magnetic disk 2, writes the track ECC (second data) to the second sector Sp of the above predetermined track Tr in accordance with the rotation of the magnetic disk 2 after writing the user data is completed, and notifies the host device 50, which is the transmitter of the write command, of the completion of the process (status response code) after writing the track ECC is completed.

Figure 4:
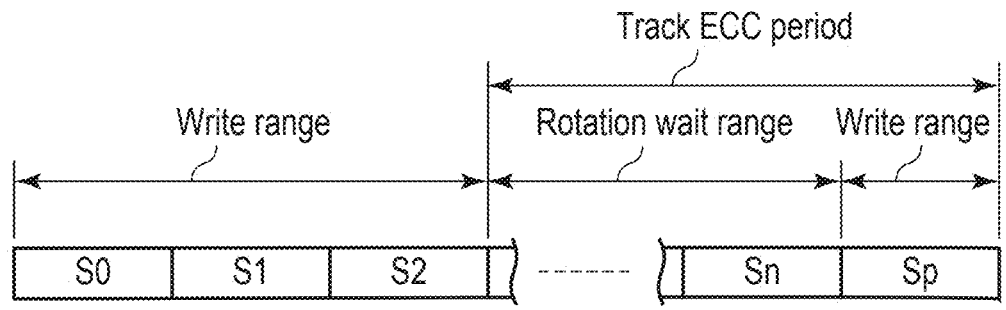
FIG. 4 is a diagram showing a data write range for each sector of FIG. 3.

That is, as shown in FIG. 4, for example, user data is written to the three first sectors S1, S2, and S3, and after writing this user data is completed, the track ECC is written to the last second sector Sp as the magnetic disk 2 rotates (after waiting for a predetermined period of rotation). The combined period of the period of waiting for the rotation and the period of writing the track ECC to the second sector Sp is the track ECC period.

Figure 5:
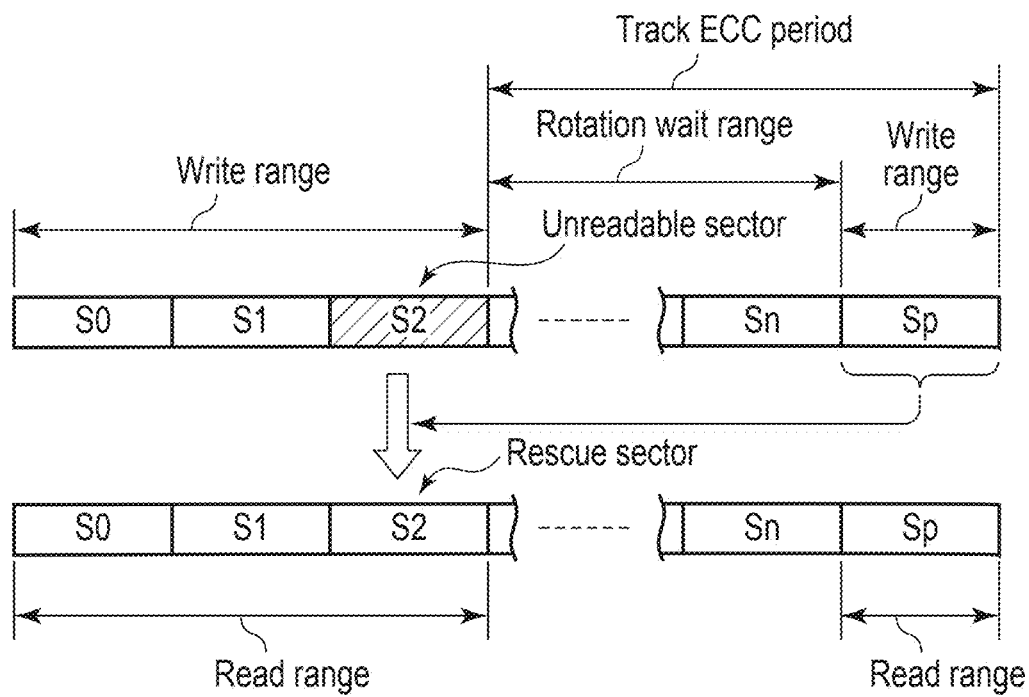
FIG. 5 is a diagram showing a data read range for each sector of FIG. 4 and a situation in which data in unreadable sectors is rescued with an error correcting code.

For example, if the data in the first sector S3 shown in FIG. 5 cannot be read when reading data, the error in the data in the first sector S3 is detected and corrected by the track ECC in the second sector Sp by writing the track ECC. In other words, the data in the first sector S3 is rescued by the track ECC.

[Second Write Control Section 30*e*]

The second write control section 30*e* seeks the magnetic head 10 to a predetermined track Tr among the tracks Tr of the magnetic disk 2 under the control of the seek control section 30*b* and, writes user data (first data) to the predetermined number of first sectors from the beginning, among the first sectors S1, S2, . . . Sn on the predetermined track Tr in accordance with the rotation of the magnetic disk 2, and notifies the host device 50, which is the transmitter of the write command, of the completion of the process (status response code) after writing the user data is completed.

[Selection Control Section 30*f*]

When receiving a write command from the external host device 50, the selection control section 30*f* estimates time tx required from the start of processing (start of seek) to the end of processing (completion of transmitting the write command) in the first write control section 30*d*, compares the estimated time tx with time limit ta specified in advance, and selectively executes either the processing in the first write control section 30*d* or the processing in the second write control section 30*e*.

More specifically, the selection control section 30*f* executes the processing of the first write control section 30*d* when the estimated time tx is the same as or shorter than the time limit ta or executes the processing of the second write control section 30*e* when the estimated time tx is longer than the time limit ta.

Figure 6:
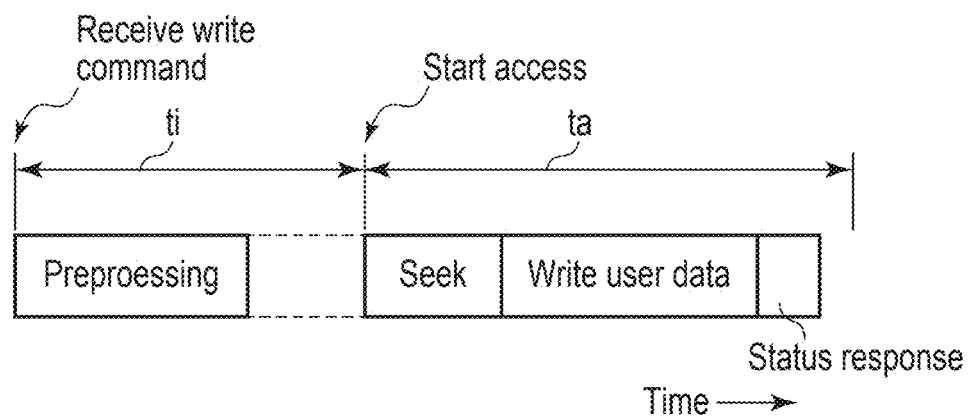
FIG. 6 is a diagram showing a time limit (ti+ta) of the latency limit in each embodiment.

The time limit ti is an element of the time limit (ti+ta) of the latency limit specified by 1 Command Duration Limits (CDL) function of the host device 50, and is an inactive time limit that limits the write preparation time including predetermined preprocessing from the receipt of the write command to the time immediately before the disk access (immediately before the seek), as shown in FIG. 6. The write preparation time is set to be within this time limit ti.

The time limit ta is also an element of the time limit (ti+ta) of the latency limit specified by the CDL function of the host device 50, and is an Active Time Limit that limits the write execution time including "seeking magnetic head 10", "writing user data", "track ECC", and "status response" from the start of disk access (start of seek) to the transmission of the status response code, as shown in FIG. 6.

A code specifying this time limit ti and ta is included in the write command transmitted from the host device 50 to the magnetic disk device 1. By specifying the time limit ta, the host device 50 requires the magnetic disk device 1 to execute the data write process in response to one write command within the time limit ta.

Figure 7:
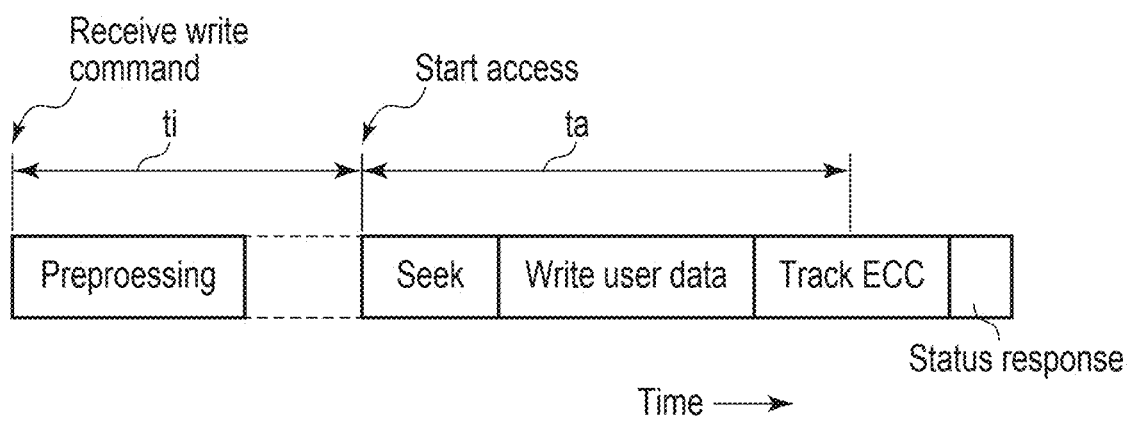
FIG. 7 is a diagram showing an example in which the end timing of the time limit ta arrives during the data write process in each embodiment.

If the track ECC is to function in addition to the CDL function of the host device 50, the end timing of the time limit ta of the latency limit may arrive during writing the track ECC to the last second sector Sp, as shown in FIG. 7.

If the end timing of the time limit ta of the latency limit arrives during writing the track ECC, the controller 30 needs to stop writing the track ECC. In this case, the magnetic disk device 1 suddenly needs to execute a procedure of forcibly writing the track ECC data that could not be written, and the performance of subsequent data write is degraded due to the sudden execution of this procedure. This performance degradation leads to delay in writing the data.

Figure 8:
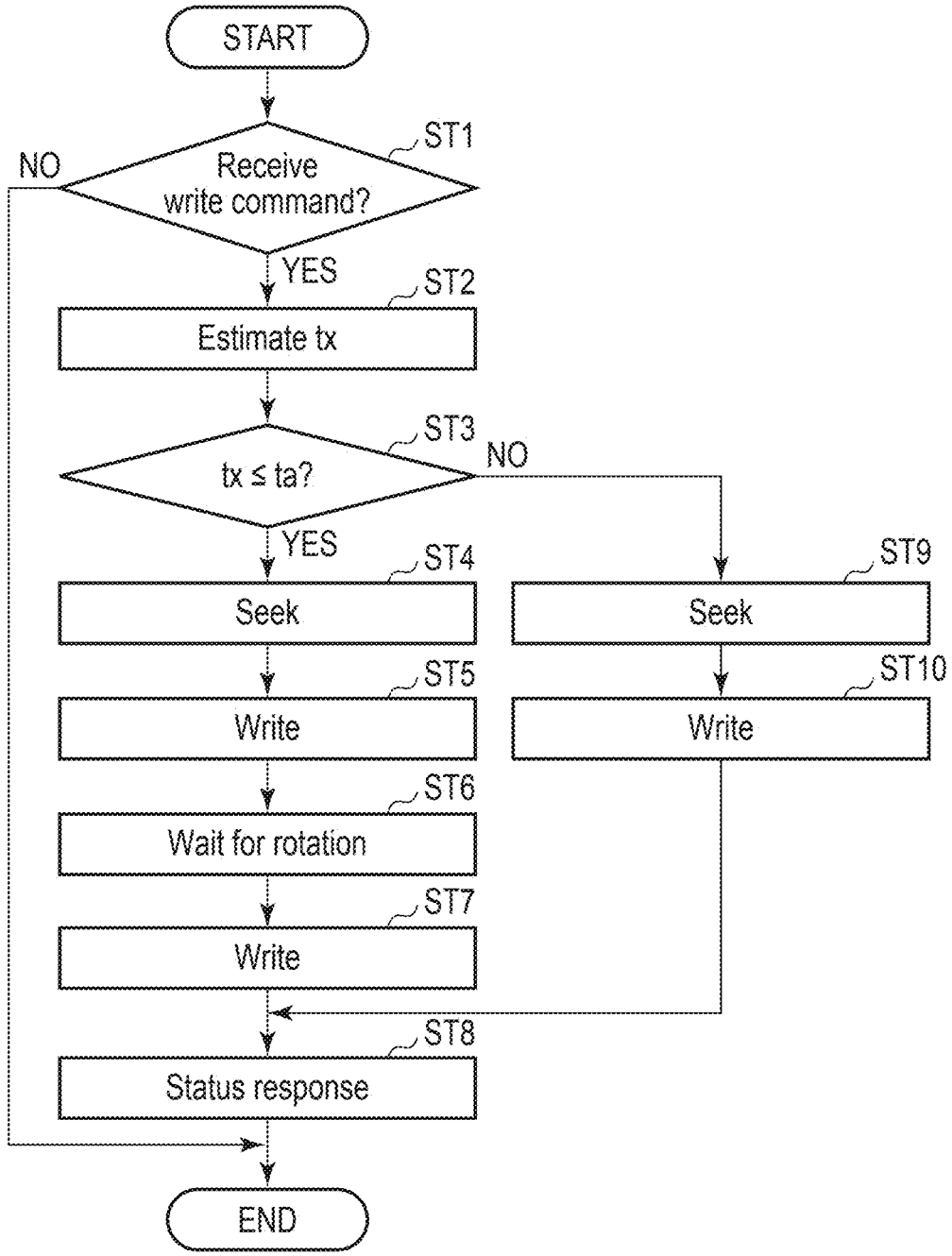
FIG. 8 is a flowchart showing control in each embodiment.

The controller 30 executes the control shown in the flowchart in FIG. 8 to prevent this problem from occurring.

When receiving a write command from the host device 50 (ST1), the controller 30 estimates the time tx required from the start of the processing (start of seek) to the end of the processing (completion of transmitting the write command) in the first write control section 30d (ST2).

More specifically, the controller 30 obtains the write execution time including "seeking magnetic head 10", "writing user data", "track ECC", and "status response" from the start of the disk access (start of seek) to the transmission of the status response code, based on control data stored in advance in an internal memory or by calculation, and estimates the obtained write execution time as time tx required from the start of processing in the first write control section 30d to the end of processing (ST2).

Then, the controller 30 compares this estimated time tx with the time limit ta specified by the CDL function of the host device 50 (ST3).

Figure 9:
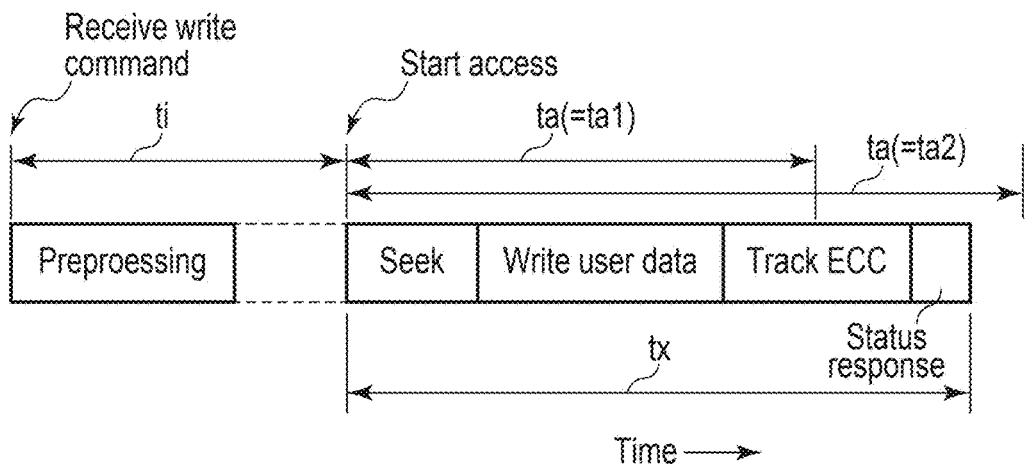
FIG. 9 is a diagram showing a relationship between an expected time tx and the time limit ta in the first embodiment.

If shorter "ta1" as shown in FIG. 9 is specified as the time limit ta by the host device 50 and the estimated time tx is the same as or shorter than the time limit ta (YES in ST3), then the controller 30 seeks the magnetic head 10 to a predetermined track Tr among the tracks Tr of the magnetic disk 2 (ST4), and writes the user data to a predetermined number of first sectors among the first sectors S1, S2, . . . , Sn in the above predetermined track Tr, from the beginning, in accordance with the rotation of the magnetic disk 2 (ST5). After completing writing the user data, the controller 30 waits for the magnetic disk 2 to rotate for a predetermined period when no user data is written (ST6), and writes track ECC (second data) to the second sector Sp at the timing when the position of the second sector Sp of the predetermined track Tr corresponds to the magnetic head 10 (ST7). After completing writing the track ECC, the controller 30 transmits a status response code indicative of the completion of the process to the host device 50, which is the transmitter of the above write command (ST8).

When receiving the status response code, the host device 50 executes a process of transmitting a next write command to the controller 30.

If longer "ta2" as shown in FIG. 9 is specified as the time limit ta by the host device 50 and the estimated time tx is longer than the time limit ta (NO in ST3), then the controller 30 seeks the magnetic head 10 to a predetermined track Tr among the tracks Tr of the magnetic disk 2 (ST9), and writes the user data to a predetermined number of first sectors among the first sectors S1, S2, . . . , Sn in the above predetermined track Tr, from the beginning, in accordance with the rotation of the magnetic disk 2 (ST10). After completing writing the user data, the controller 30 transmits a status response code indicative of the completion of the process to the host device 50, which is the transmitter of the above write command (ST8).

When receiving the status response code, the host device 50 executes a process of transmitting a next write command to the controller 30.

As described above, if the time tx from receipt of the write command to completion of "writing user data", "writing track ECC", and "status response" is estimated and if the estimated time tx does not exceed the limit time ta of the latency limit specified by the CDL function of the host device 50, the controller 30 executes a series of processes consisting of "writing user data", "writing track ECC", and "status response" to the end and can thereby write the track ECC to the second sector Sp without violating the latency limit.

If the estimated time tx exceeds the limit time ta of the latency limit, only user data is written and the status response is made without writing the track ECC, thereby eliminating the inconvenience that writing the track ECC may be stopped during the writing.

If no track ECC is written, error correction for the written user data cannot be executed. In consideration of this point, the controller 30 selects appropriate timing for preventing a subsequent data write performance from being degraded as write timing of the track ECC (i.e., track ECC in an unwritten state). In this case, since the controller 30 recognizes that writing the track ECC is not executed, not suddenly, but in advance, the controller 30 can accurately select appropriate timing that does not degrade the performance of writing the data, with sufficient margin. The controller 30 then writes the track ECC in an unwritten state to the magnetic disk 2 at the selected timing.

Since the track ECC is written at the appropriate timing where data write performance is not degraded, the inconvenience that subsequent data write may be unnecessarily delayed can be avoided. The reliability of data recording can be thereby improved while avoiding violations of the latency limit.

(2) Second Embodiment

A second embodiment will be described.

Figure 10:
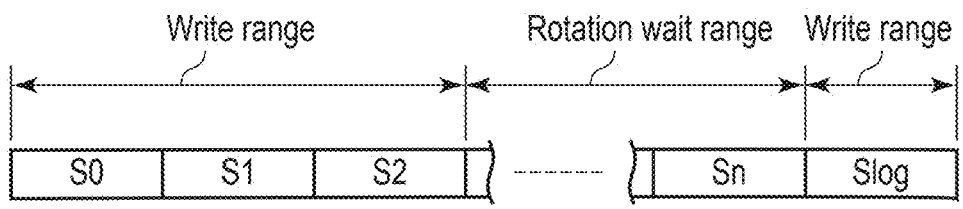
FIG. 10 is a diagram showing one track and plural sectors of a magnetic disk in a second embodiment.

As shown in FIG. 10, each track Tr of a magnetic disk 2 includes a plurality of first sectors S1, S2, . . . , Sn aligned in the circumferential direction of the magnetic disk 2 and at least one second sector Slog following the end of the arrangement of these first sectors S1, S2, . . . , Sn. The first sectors S1, S2, . . . Sn are sectors for recording user data (first data) similarly to the first embodiment. The second sector Slog is a sector for recording auxiliary log data (second data) related to writing user data to the first sectors S1, S2, . . . Sn.

Accordingly, a function of a first write control section 30d of a controller 30 is different from the function in the first embodiment.

In accordance with a write command from a host device 50, a first write control section 30d seeks the magnetic head 10 to a predetermined track Tr among the tracks Tr of the magnetic disk 2 under the control of a seek control section 30b and, writes user data (first data) to the predetermined number of first sectors from the beginning, among the first sectors S1, S2, . . . Sn on the predetermined track Tr in accordance with the rotation of the magnetic disk 2, writes log data (second data) to the second sector Sp of the above predetermined track Tr in accordance with the rotation of the magnetic disk 2 after writing the user data is completed, and notifies the host device 50, which is the transmitter of the write command, of the completion of the process (status response code) after writing the log data is completed.

Processes in steps ST2 and ST3 in the flowchart shown in FIG. 8, among the control executed by the controller 30, are different from those in the first embodiment.

The controller 30 obtains the write execution time including "seeking magnetic head 10", "writing user data", "log data", and "status response" from the start of the disk access (start of seek) to the transmission of the status response code, based on control data stored in advance in an internal memory or by calculation, and estimates the obtained execution time as time tx required from the start of processing in the first write control section 30d to the end of processing (ST2). Then, the controller 30 compares this estimated time tx with the time limit ta specified by the CDL function of the host device 50 (ST3).

Figure 11:
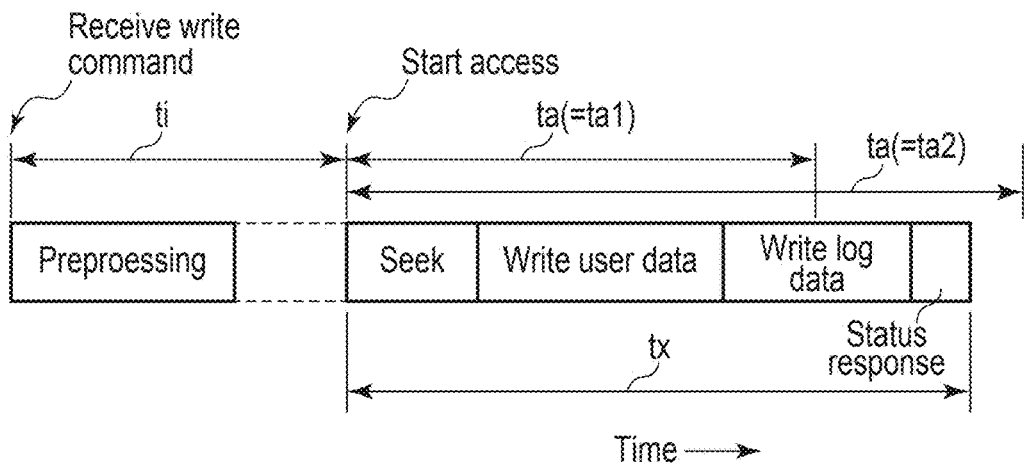
FIG. 11 is a diagram showing a relationship between an expected time tx and a time limit ta in the second embodiment.

If shorter "ta1" as shown in FIG. 11 is specified as the time limit ta by the host device 50 and the estimated time tx is the same as or shorter than the time limit ta (YES in ST3), then the controller 30 seeks the magnetic head 10 to a predetermined track Tr among the tracks Tr of the magnetic disk 2 (ST4), and writes the user data to a predetermined number of first sectors among the first sectors S1, S2, . . . , Sn in the above predetermined track Tr, from the beginning, in accordance with the rotation of the magnetic disk 2 (ST5). After completing writing the user data, the controller 30 waits for the magnetic disk 2 to rotate for a predetermined period when no user data is written (ST6), and writes the log data to the second sector Sp at the timing when the position of the second sector Sp of the predetermined track Tr corresponds to the magnetic head 10 (ST7). After completing writing the track ECC, the controller 30 transmits a status response code indicative of the completion of the process to the host device 50, which is the transmitter of the above write command (ST8).

When receiving the status response code, the host device 50 executes a process of transmitting a next write command to the controller 30.

If longer "ta2" as shown in FIG. 11 is specified as the time limit ta by the host device 50 and the estimated time tx is longer than the time limit ta (NO in ST3), then the controller 30 seeks the magnetic head 10 to a predetermined track Tr among the tracks Tr of the magnetic disk 2 (ST9), and writes the user data to a predetermined number of first sectors among the first sectors S1, S2, . . . , Sn in the above predetermined track Tr, from the beginning, in accordance with the rotation of the magnetic disk 2 (ST10). After completing writing the user data, the controller 30 transmits a status response code indicative of the completion of the process to the host device 50, which is the transmitter of the above write command (ST8).

When receiving the status response code, the host device 50 executes a process of transmitting a next write command to the controller 30.

As described above, if the time tx from receipt of the write command to completion of "writing user data", "writing log data", and "status response" is estimated and if the estimated time tx does not exceed the limit time ta of the latency limit specified by the CDL function of the host device 50, the controller 30 executes a series of processes consisting of "writing user data", "writing log data", and "status response" to the end and can thereby write the log data to the second sector Slog without violating the latency limit.

If the estimated time tx exceeds the limit time ta of the latency limit, only user data is written and the status response is made without writing the log data, thereby eliminating the inconvenience that writing the log data may be stopped during the writing.

If no log data is written, the log related to the written user data cannot be checked. In consideration of this point, the controller 30 selects appropriate timing for preventing a subsequent data write performance from being degraded as write timing of the log data (i.e., log data in an unwritten state). In this case, since the controller 30 recognizes that writing the track ECC is not executed, not suddenly, but in advance, the controller 30 can accurately select appropriate timing that does not degrade the performance of writing the data, with sufficient margin. The controller 30 then writes the log data in an unwritten state to the magnetic disk 2 at the selected timing.

Since the log data is written at the appropriate timing where data write performance is not degraded, the inconvenience that subsequent data write may be unnecessarily delayed can be avoided. The reliability of data recording can be thereby improved while avoiding violations of the latency limit.

The other constituent elements and control are the same as those of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a circular magnetic disk including a plurality of tracks for data recording composed of a plurality of sectors arranged in a circumferential direction, the tracks being formed to be arranged in a radial direction;
   a magnetic head provided to seek in the radial direction of the magnetic disk and which writs and reads data to and from the magnetic disk; and
   a controller which controls rotation of the magnetic disk and seek of the magnetic head, wherein
   the controller includes:
   a first write control section of writing first data and second data to each of the sectors of a predetermined track among the tracks;
   a second write control section of writing the first data to each of the sectors of a predetermined track among the tracks; and
   a selection control section of, when receiving a write command, estimating the time required from start of a process of the first write control section to end of the process, and selectively executing the process of the first write control section or a process of the second write control section by comparing the estimated time with a time limit specified in advance.

2. The device according to claim 1, wherein
   when receiving the write command, the selection control section estimates the time required from the start of the process of the first write control section to the end of the process, and executes the process of the first write control section if the estimated time is the same as or shorter than the time limit specified in advance or executes the process of the second write control section if the estimated time is longer than the time limit specified in advance.

3. The device according to claim 1, wherein
the magnetic disk includes the plurality of tracks for data recording composed of a plurality of sectors arranged in the circumferential direction and at least one second sector subsequent with the first sectors, and the tracks are formed to be arranged in a radial direction.

4. The device according to claim 3, wherein
the first write control section writes the first data to each of the first sectors of the predetermined track among the tracks, and writes the second data to the second sector of the predetermined track, and
the second write control section writes the first data to each of the first sectors of the predetermined track among the tracks.

5. The device according to claim 3, wherein
the first write control section seeks the magnetic head to a predetermined track among the tracks, writes the first data to a predetermined number of first sectors from the beginning, among the first sectors of the predetermined track in accordance with the rotation of the magnetic disk, and writes the second data to the second sector of the predetermined track in accordance with the rotation of the magnetic disk after completing writing the first data, and
the second write control section seeks the magnetic head to a predetermined track among the tracks, and writes the first data to a predetermined number of first sectors from the beginning, among the first sectors of the predetermined track in accordance with the rotation of the magnetic disk.

6. The device according to claim 1, wherein
after completing writing the second data, the first write control section notifies a transmitter of the write command of completion of the process, and after completing writing the first data, the second write control section notifies the transmitter of the write command of completion of the process.

7. The device according to claim 1, wherein
the time limit is a time limit of latency limit specified by a CDL function of an external device.

8. The device according to claim 1, wherein
the first data is user data, and
the second data is an error-correcting code executing error detection and correction of the user data for each of the tracks.

9. The device according to claim 1, wherein
the first data is user data, and
the second data is log data related to the user data.

10. A method of controlling a magnetic disk device comprising a circular magnetic disk including a plurality of tracks for data recording composed of a plurality of sectors arranged in a circumferential direction, the tracks being arranged in a radial direction, a magnetic head provided to seek in the radial direction of the magnetic disk and writing and reading data to and from the magnetic disk, and a controller controlling rotation of the magnetic disk and seek of the magnetic head, the method comprising:
first write control of writing first data and second data to each of the sectors of a predetermined track among the tracks;
second write control of writing the first data to each of the sectors of a predetermined track among the tracks; and
selection control of, when receiving a write command, estimating the time required from start of a process of the first write control to end of the process, and selectively executing the process of the first write control or a process of the second write control by comparing the estimated time with a time limit specified in advance.

* * * * *